W. DICKIE.
Wheel-Plows.

No. 158,048.

Patented Dec. 22, 1874.

WITNESSES:
Chas. Nida
A. F. Terry

INVENTOR:
William Dickie
BY
ATTORNEYS.

UNITED STATES PATENT OFFICE.

WILLIAM DICKIE, OF GILLESPIE, ILLINOIS.

IMPROVEMENT IN WHEEL-PLOWS.

Specification forming part of Letters Patent No. 158,048, dated December 22, 1874; application filed October 24, 1874.

*To all whom it may concern:*

Figure 1:
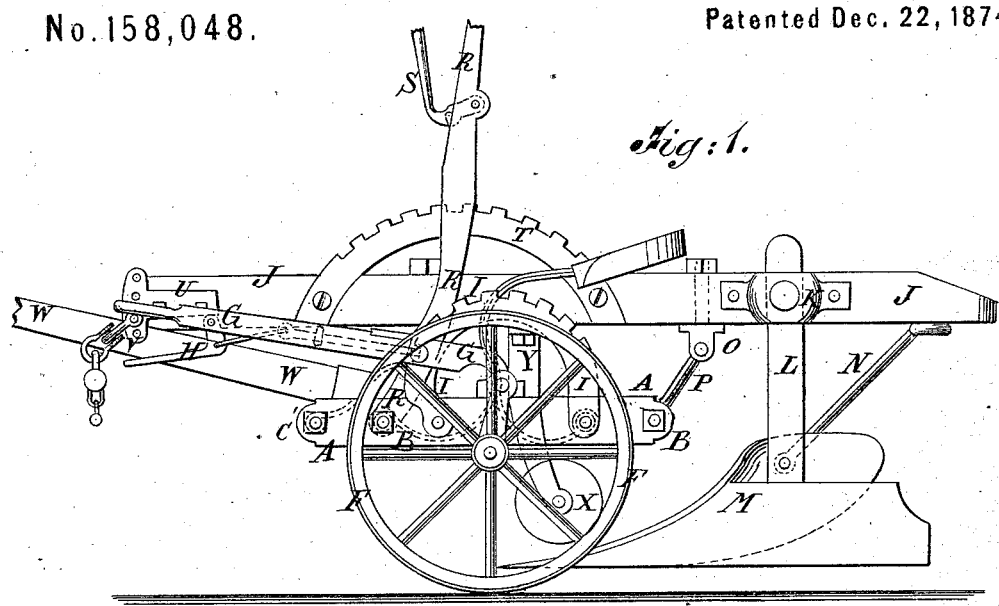
Figure 2:
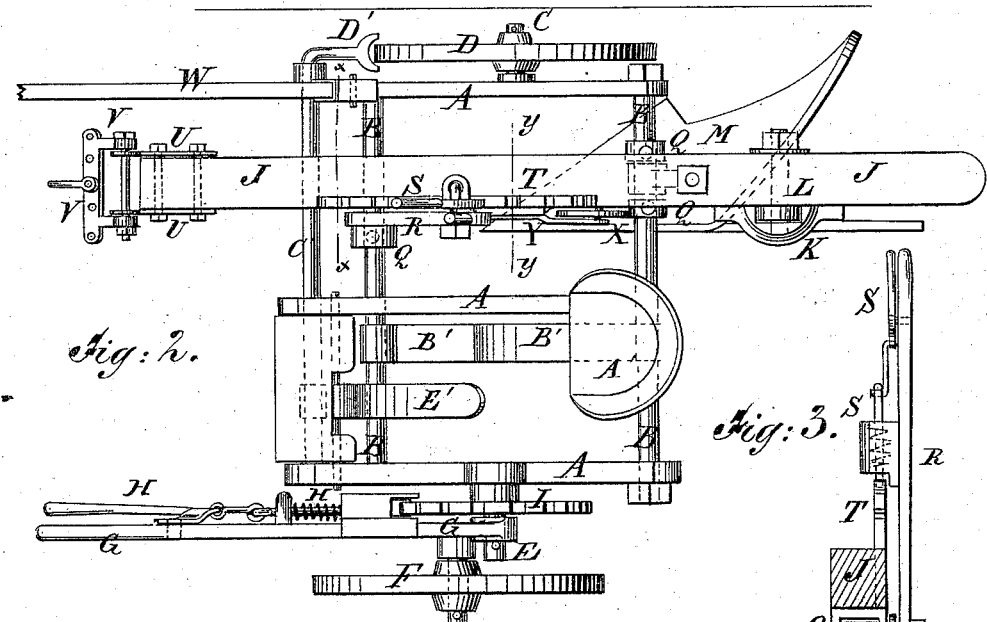
Figure 3:
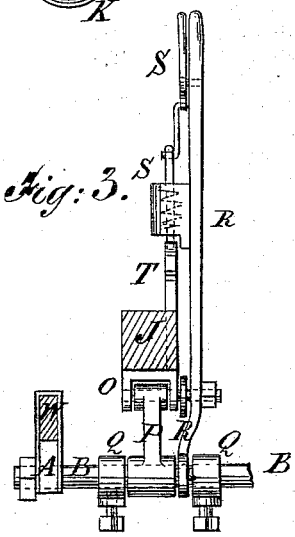
Figure 4:
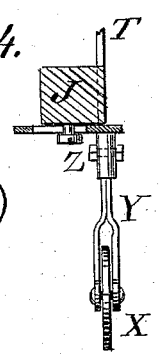

Be it known that I, WILLIAM DICKIE, of Gillespie, in the county of Macoupin and State of Illinois, have invented a new and useful Improvement in Wheel-Plow, of which the following is a specification:

Figure 1 is a side view of my improved wheel-plow. Fig. 2 is a top view of the same. Fig. 3 is a detail section taken through the line $x$ $x$, Fig. 2. Fig. 4 is a detail section.

Similar letters of reference indicate corresponding parts.

My invention has for its object to furnish an improved wheel-plow, simple in construction, effective in operation, and convenient in use, being easily raised from and lowered to the ground, adjusted to work at any desired depth in the ground, and to run level whatever may be the depth of the furrow being plowed, and when both wheels are running upon the unplowed land. The invention consists in the construction and arrangement of parts, which will be hereinafter more fully described, and subsequently pointed out in the claims.

The frame of the machine consists of two or three side or longitudinal bars, A, connected by two cross-rods, B. To the right-hand or plowed-land side bar A is rigidly attached an axle-arm, C, upon which revolves the wheel D, which runs in the furrow opened by the plow at its previous round. To the left-hand or land-side side bar A is pivoted a crank-axle arm, E, upon the journal of which revolves the wheel F, that runs upon the unplowed land. To the crank-axle E is rigidly attached a lever, G, to the side of which is attached a lever-pawl, H, the engaging end of which takes hold of a notched or toothed bar, I, attached to the side bar A. By this construction, by operating the lever G the wheel F may be lowered to run upon the same level with the wheel D, or raised to run at any desired height above the level of the said wheel D. J is the plow-beam, to the side of which, near its rear end, is attached a socket, K, to receive the standard L of the plow M, where it is secured in place by a bolt passing through the said socket and beam. The draft-strain upon the plow M is sustained by the brace-rod N, the lower end of which is secured to the lower part of the standard L, and its upper end is bolted to the rear end of the beam J. To the under side of the plow-beam J, in front and rear of its center, are attached two lugs or brackets, O, to which are pivoted the upper ends of two rods or arms, P, the lower ends of which have wide or tubular eyes formed in them, to receive and fit upon the cross-rods B of the frame A B, where they are secured in place by sliding or ring collars Q, which are secured in place by set-screws. R is a lever, the lower end of which has an eye formed in it to receive the cross-bar B, upon which it is placed, between the eye of the forward arm P and the ring-collar Q. The lever R is pivoted to the forward arm P by the bolt that pivots the upper end of the said arm P to its bracket O. To the lever R is pivoted a lever-pawl, S, the engaging end of which takes hold of the notched bar T, attached to the plow-beam J. By this construction, by operating the lever R the plow-beam and plow may be raised from and lowered to the ground, and adjusted to work at any desired depth in the ground, and will be held securely, by the pawl S and notched bar T, in any position into which it may be adjusted. The rear arm P is made longer than the forward arm, so that the rear end of the plow-beam J may rise faster than the forward end, so as to raise the plow quicker from the ground. To the opposite sides of the forward end of the plow-beam J are bolted two bars, U, the forward ends of which project in front of said beam, and have vertical cross-heads formed upon them, in which are formed a number of holes to receive the bolt of the horizontal clevis V, in the front bar of which are formed a number of holes to receive the clevis-bolt of the double-tree or triple-tree clevis, according as two or three horses are to be worked abreast. By this construction a double clevis is formed, which enables the point of draft attachment to be adjusted vertically or laterally, as may be desired. W is the tongue, the rear end of which is secured to the forward end of the right-hand bar A of the frame A B. X is a rotary cutter, which is pivoted to the forked lower end of the standard Y. The upper end of the standard Y is inserted in a socket, Z, where it is secured by bolts. The base of the socket Z is slotted to receive the bolts by which it is secured to the plow-beam J, so that the cutter can be conveniently adjusted as may be required. A′ is the driver's seat, which is attached to the upper end of the spring-standard B′. The lower part of the spring-standard B′ is branched, the end of the forward branch being attached to the forward cross-rod B, and the end of the rear branch being attached to the rear cross-rod B. To the forward end of the longitudinal bars A of the frame A B is pivoted a shaft, C′, upon the right-hand end of which is formed an arm, upon the end of which is formed a brake-shoe, D′, which, by turning the shaft C′, may be pressed against the right-hand wheel D, to throw more draft upon the forward end of the plow-beam J, and thus assist the driver in raising the plow out of the ground. To the brake-shaft C, near its end, is attached a lever, E′, in such a position that the driver can conveniently operate it with his foot to apply the brake, when desired.

Having thus described my invention, I claim as new and desire to secure by Letters Patent—

1. The combination of the brackets O, adjustable pivoted arms P, and adjustable collars Q with the plow-beam J and the cross-rods B of the frame A B, substantially as herein shown and described.

2. The combination of the lever R, the lever-pawl S, and the notched bar T with the plow-beam J, the forward pivoted arm P, and the forward cross-rod B of the frame A B, substantially as herein shown and described.

3. The branched spring-standard B′, in combination with the rods B of the frame A B, for supporting the driver's seat A′, and making it adjustable laterally, substantially as herein shown and described.

WILLIAM DICKIE.

Witnesses:
DAVID DICKIE,
FRANSES GUSTAF KIMBELL.